United States Patent
Deguchi et al.

(10) Patent No.: US 10,819,267 B2
(45) Date of Patent: Oct. 27, 2020

(54) CONTROLLER FOR SWITCHED RELUCTANCE MOTOR

(71) Applicant: TOYOTA JIDOSHA KABUSHIKI KAISHA, Toyota-shi, Aichi-ken (JP)

(72) Inventors: Junichi Deguchi, Susono (JP); Hideki Kubonoya, Toyota (JP); Tadashi Fujiyoshi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/185,331

(22) Filed: Nov. 9, 2018

(65) Prior Publication Data

US 2019/0158009 A1 May 23, 2019

(30) Foreign Application Priority Data

Nov. 22, 2017 (JP) ................. 2017-224663

(51) Int. Cl.
*H02P 25/092* (2016.01)
*H02P 25/086* (2016.01)
*B60L 15/06* (2006.01)
*H02P 25/08* (2016.01)

(52) U.S. Cl.
CPC ............ *H02P 25/086* (2013.01); *B60L 15/06* (2013.01); *H02P 25/08* (2013.01); *H02P 25/092* (2016.02); *H02P 25/0925* (2016.02); *B60L 2210/40* (2013.01)

(58) Field of Classification Search
USPC ............................................. 318/254.1, 701
See application file for complete search history.

(56) References Cited

U.S. PATENT DOCUMENTS

| | | | |
|---|---|---|---|
| 3,757,186 A * | 9/1973 | Ozawa ...................... | B60L 9/00 318/514 |
| 2008/0121136 A1* | 5/2008 | Mari ......................... | B61C 5/00 105/35 |
| 2014/0035292 A1* | 2/2014 | Gronwald ............... | F02N 11/087 290/38 R |
| 2016/0211788 A1* | 7/2016 | Deguchi ............. | H02P 25/0925 |
| 2019/0267924 A1* | 8/2019 | Deguchi ................ | H02K 19/10 |

FOREIGN PATENT DOCUMENTS

| | | |
|---|---|---|
| EP | 3045345 A1 | 7/2016 |
| EP | 3188358 A1 | 7/2017 |
| JP | 2016-134937 A | 7/2016 |

* cited by examiner

*Primary Examiner* — Bentsu Ro
(74) *Attorney, Agent, or Firm* — Oliff PLC

(57) ABSTRACT

A controller for a switched reluctance motor is provided. The switched reluctance motor includes a rotor, a stator, and a coil wound on the stator. The switched reluctance motor is mounted on a vehicle as a drive source for propelling the vehicle. The controller includes an electronic control unit. The electronic control unit is configured to execute first control for exciting the coil at a first current value in a first exciting range. The electronic control unit is configured to, when the electronic control unit determines that the vehicle is not able to start moving even when the electronic control unit executes the first control, execute second control for exciting the coil at a second current value larger than the first current value in a second exciting range narrower than the first exciting range.

8 Claims, 6 Drawing Sheets

CONTROLLER FOR SWITCHED RELUCTANCE MOTOR

CROSS-REFERENCE TO RELATED APPLICATIONS

This application claims priority to Japanese Patent Application No. 2017-224663 filed on Nov. 22, 2017, which is incorporated herein by reference in its entirety.

BACKGROUND

Technical Field

The disclosure relates to a controller for a switched reluctance motor that is mounted on a vehicle.

Description of Related Art

There is known a switched reluctance motor. The switched reluctance motor includes a stator, a rotor, and three-phase coils. Each of the stator and the rotor includes a plurality of salient poles. The salient poles of the stator and the salient poles of the rotor face each other. The three-phase coils are wound around the salient poles of the stator. The switched reluctance motor causes the rotor to rotate by magnetic attraction generated between the salient poles of the stator and the salient poles of the rotor.

For example, Japanese Unexamined Patent Application Publication No. 2016-134937 (JP 2016-134937 A) describes a technique related to such a switched reluctance motor. With the technique is to, when a vehicle with a switched reluctance motor is not able to start moving, the startability of the vehicle is improved by passing a current larger than that of regular control to three-phase coils.

SUMMARY

However, if a current that is passed through the coils is increased in order to improve the startability of the vehicle as described in JP 2016-134937 A, the amount of heat generated by the coils can possibly increase. As a result, for example, it is required to increase the size of a cooling device in order to reduce heat generation.

The disclosure is made in view of the above situation, and provides a controller for a switched reluctance motor, which is able to improve the startability of a vehicle while reducing heat generation of the coils.

An aspect of the disclosure provides a controller for a switched reluctance motor. The switched reluctance motor includes a rotor, a stator, and a coil wound on the stator. The switched reluctance motor is mounted on a vehicle as a drive source for propelling the vehicle. The controller includes an electronic control unit. The electronic control unit is configured to execute first control for exciting the coil at a first current value in a first exciting range. The electronic control unit is configured to execute second control for exciting the coil at a second current value larger than the first current value in a second exciting range narrower than the first exciting range, when the electronic control unit determines that the vehicle is not able to start moving even when the electronic control unit executes the first control. Each of the first and second exciting ranges may be a range of a rotation angle of the rotor from start of excitation of the coil to stop of the excitation.

With the thus configured controller, when the vehicle does not start moving even when the electronic control unit executes the first control, the coil is excited at a current value larger than that of the first control in an exciting range narrower than that of the first control. Thus, in comparison with the case where the coil is excited at a current value larger than that of the first control in the same exciting range as that of the first control, it is possible to reduce heat generation of the coil. Therefore, it is possible to reduce heat generation of the coil and also improve the startability of the vehicle.

In the controller, the electronic control unit may be configured to execute the second control over a phase coil having an inductance of a positive gradient, and execute the first control over a phase coil having an inductance of a negative gradient. In the case of the inductance of the positive gradient, the inductance may increase as a rotation angle of the rotor increases. In the case of the inductance of the negative gradient, the inductance may decrease as the rotation angle of the rotor increases.

With the thus configured controller, it is possible to efficiently increase torque by executing the second control over only a phase coil having an inductance of a positive gradient.

In the controller, the electronic control unit may be configured to execute the second control over a plurality of phase coils having the inductance of the positive gradient, when the electronic control unit determines that there is the plurality of phase coils having an inductance of the positive gradient and determines that the vehicle is not able to start moving even when the electronic control unit executes the second control over one of the plurality of phase coils having the inductance of the positive gradient. The electronic control unit may be configured to execute the first control over a phase coil having the inductance of the negative gradient in the coil, when the electronic control unit determines that there is a plurality of phase coils having the inductance of the positive gradient and determines that the vehicle is not able to start moving even when the electronic control unit executes the second control over one of the plurality of phase coils having the inductance of the positive gradient.

With the thus configured controller, it is possible to further reliably cause the vehicle to start moving by executing the second control over the plurality of phase coils having the inductance of the positive gradient.

In the controller, the electronic control unit may be configured to execute the second control over one of a plurality of phase coils having the inductance of the positive gradient and the largest gradient in the coil, when the electronic control unit determines that there is the plurality of phase coils having the inductance of the positive gradient and determines that the vehicle is able to start moving when the electronic control unit executes the second control over one of the plurality of phase coils having the inductance of the positive gradient. The electronic control unit may be configured to execute the first control over a plurality of phase coils in the coil, when the electronic control unit determines that there is the plurality of phase coils having an inductance of the positive gradient and determines that the vehicle is able to start moving when the electronic control unit executes the second control over one of the plurality of phase coils having the inductance of the positive gradient.

With the thus configured controller, it is possible to further efficiently increase torque by executing the second control over one of the plurality of phase coil having the inductance of the positive gradient and the largest gradient.

In the controller, the electronic control unit may be configured to execute the second control only when a temperature of a phase coil or a plurality of the phase coils having the inductance of the positive gradient is lower than or equal to a predetermined threshold.

In the controller, a total amount of current in the first exciting range of the first control may be equal to a total amount of current in the second exciting range of the second control.

With the thus configured controller, it is possible to increase torque while keeping the amount of heat generation of the coil at the same level as that of the first control even when the second control is executed instead of the first control.

As described above, with the controller according to the aspect of the disclosure, when the vehicle does not start moving even when the first control for exciting the coil at a predetermined current value in a predetermined exciting range is executed, the second control for exciting the coil at a current value larger than that of the first control in an exciting range narrower than that of the first control is executed. Thus, it is possible to improve the startability of the vehicle while reducing heat generation of the coil.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of a controller for a switched reluctance motor according to the disclosure will be described with reference to the accompanying drawings. The disclosure is not limited to the following embodiment. Components in the following embodiment also include components easily replaceable by persons skilled in the art, and substantially identical components.

Figure 1:
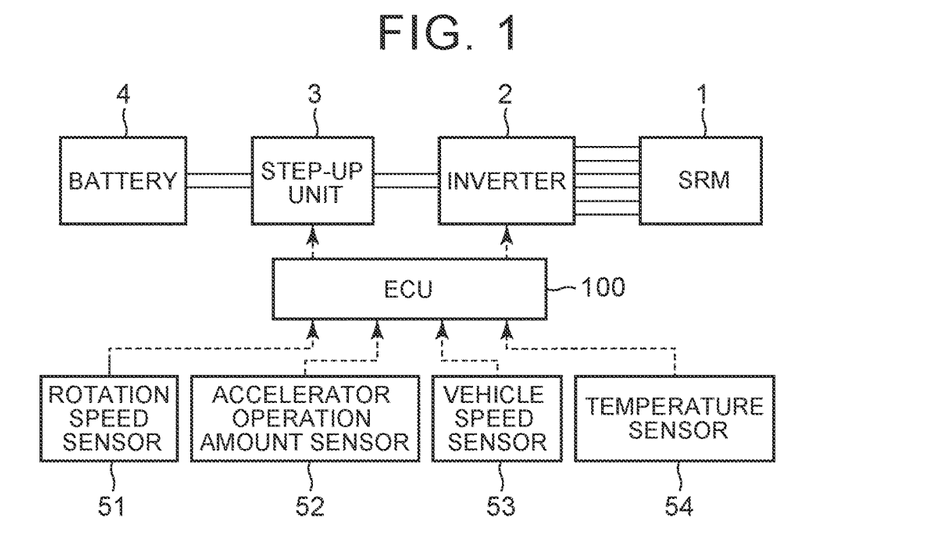
FIG. 1 is a block diagram that schematically shows the configuration of a system including a controller for a switched reluctance motor according to an embodiment of the disclosure.

As shown in FIG. 1, a system of the present embodiment includes a switched reluctance motor (hereinafter, referred to as SR motor) 1, an inverter 2, a step-up unit 3, a battery 4, and an electronic control unit 100. A controller for the SR motor 1 according to the present embodiment includes at least the inverter 2 and the electronic control unit 100.

The SR motor 1 is mounted on a vehicle as a drive source for propelling the vehicle. As shown in FIG. 1, the SR motor 1 is electrically connected to the battery 4 via the inverter 2 and the step-up unit 3. The SR motor 1 and the inverter 2 are electrically connected to each other via coils 12 (see FIG. 2). The SR motor 1 functions as not only an electric motor but also a generator.

Figure 2:
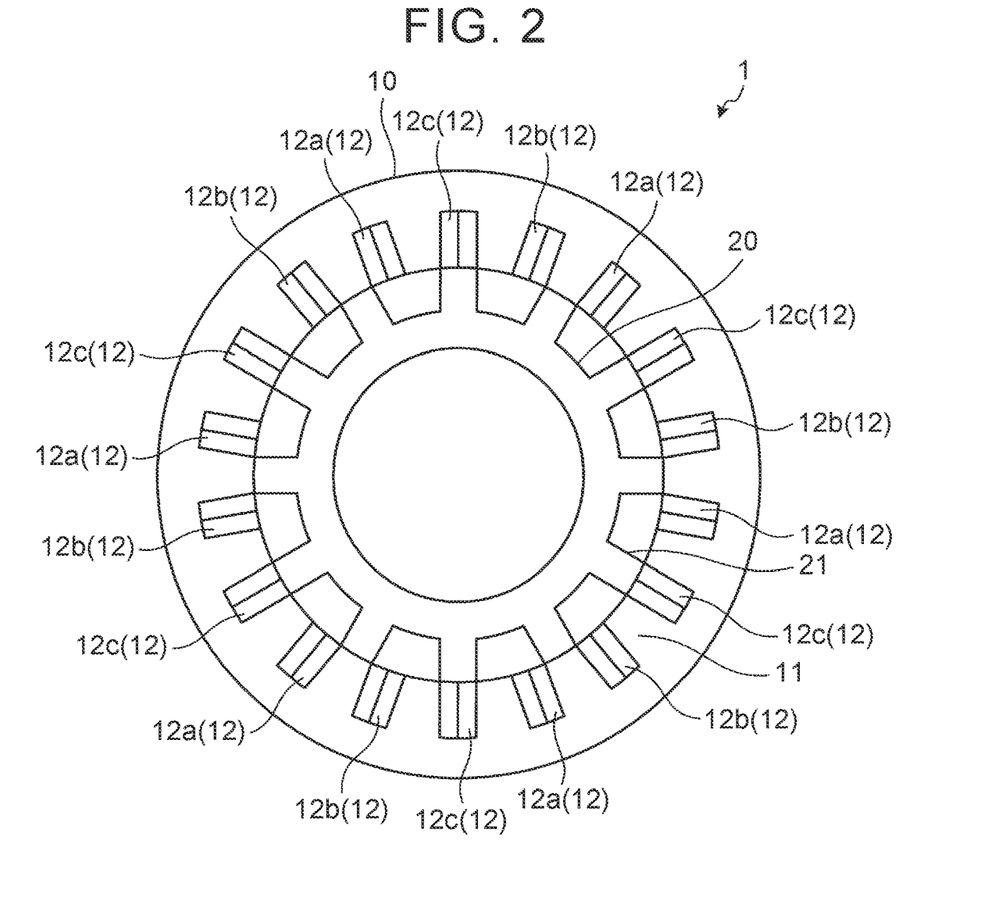
FIG. 2 is a diagram that schematically shows the structure of a switched reluctance motor in the system including the controller for a switched reluctance motor according to the embodiment of the disclosure.

The SR motor 1 is an electric motor that does not use a permanent magnet in a rotor 20. The SR motor 1 is driven as exciting currents (hereinafter, referred to as currents) respectively pass through the three-phase coils 12 wound on a stator 10. As shown in FIG. 2, the SR motor 1 includes the salient pole stator 10 and the salient pole rotor 20. FIG. 2 shows the structure of the SR motor 1 including the 18-pole stator 10 and the 12-pole rotor 20 as an example.

The SR motor 1 includes a U phase, a V phase, and a W phase. The U phase includes pairs of stator teeth 11 and a coil 12a. The V phase includes pairs of stator teeth 11 and a coil 12b. The W phase includes pairs of stator teeth 11 and a coil 12c.

As shown in FIG. 2, the stator 10 includes the plurality of stator teeth 11 at the inner periphery of its annular structure. The stator teeth 11 serve as salient poles. The coils 12 connected to the inverter 2 are wound around the stator teeth 11.

The rotor 20 is disposed radially inward of the stator 10. The rotor 20 includes a plurality of rotor teeth 21 at the outer periphery of its annular structure. The rotor teeth 21 serve as salient poles. The rotor 20 is configured to rotate integrally with a rotor shaft (not shown).

Figure 3:
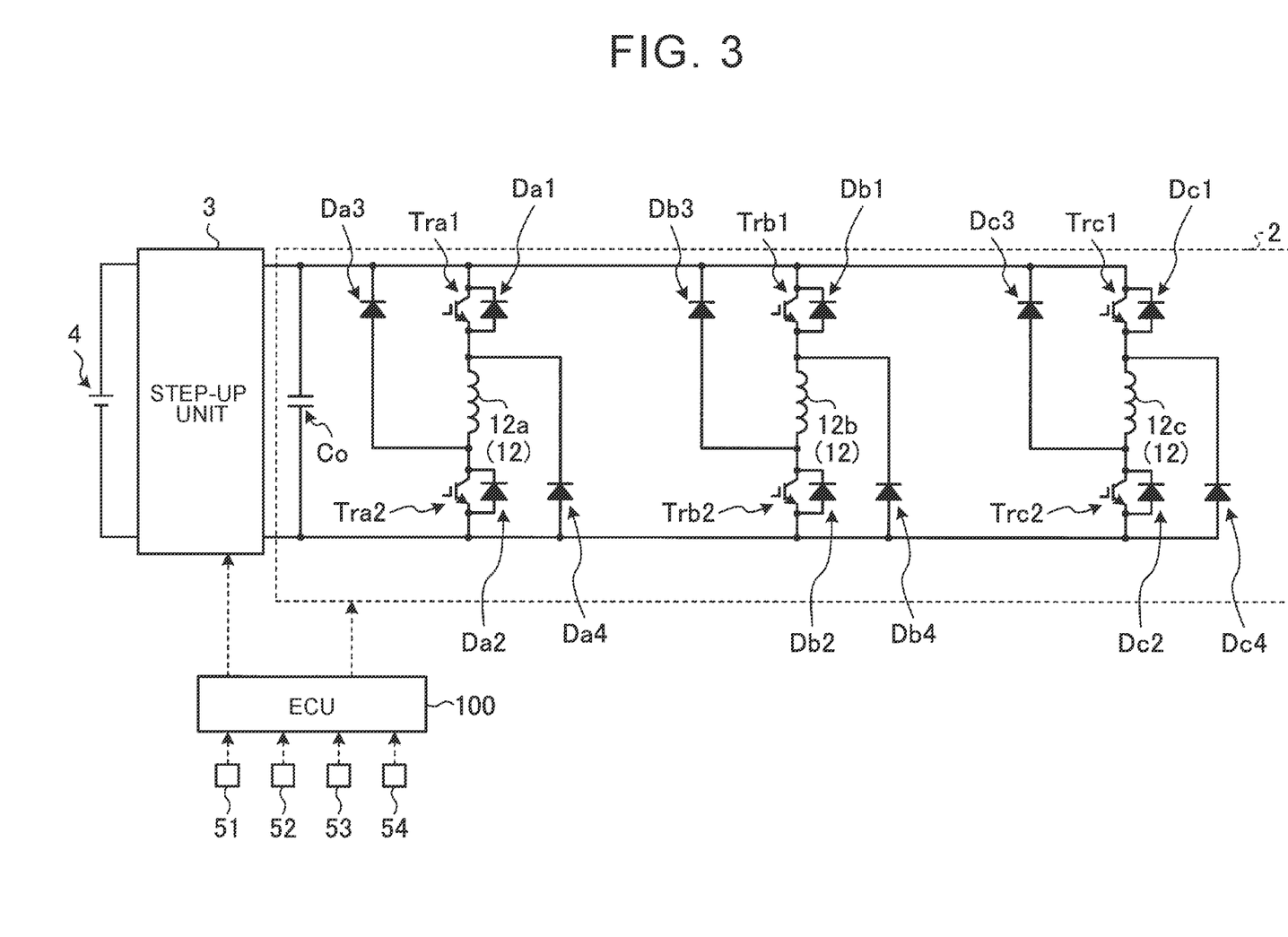
FIG. 3 is a diagram that schematically shows the configuration of an inverter in the system including the controller for a switched reluctance motor according to the embodiment of the disclosure.

As shown in FIG. 3, the inverter 2 is formed of an electrical circuit (inverter circuit). The inverter circuit includes a plurality of switching elements so as to be able to respectively pass three-phase alternating currents to the coils 12. As shown in FIG. 3, in the inverter 2, three asymmetric half bridge circuits are connected in parallel with one another. The inverter 2 is configured to be able to excite each of the three-phase coils 12a, 12b, 12c respectively included in the hall bridge circuits independently of one another, and be able to control each of currents respectively passing through the three-phase coils 12a, 12b, 12c independently of one another. That is, the SR motor 1 is able to be driven with a single phase, and has such a characteristic that the SR motor 1 is difficult to generate heat, for example, even when the SR motor 1 continues outputting high torque.

Other than the SR motor 1, a permanent magnet synchronous motor (hereinafter, referred to as PM motor) is known as a motor that is mounted on a vehicle. An inverter of the PM motor is formed of full-bridge circuits. The inverter of the PM motor is not able to independently excite each of three-phase coils, and is not able to independently control each of currents respectively passing through the three-phase coils. That is, the PM motor is not able to be driven with a single phase, and is easy to generate heat, for example, when the PM motor continues outputting high torque.

The inverter circuit that constitutes the inverter 2 includes a plurality of transistors, a plurality of diodes, and a single capacitor Co. The pair of transistors and the plurality of diodes are provided phase by phase. The inverter 2 changes a current value passing through the coil 12 by simultaneously turning on or off the pair of transistors in each phase.

The inverter 2 includes transistors Tra1, Tra2 and diodes Da1, Da2, Da3, Da4 around the U-phase coil 12a. The inverter 2 includes transistors Trb1, Trb2 and diodes Db1, Db2, Db3, Db4 around the V-phase coil 12b. The inverter 2 includes transistors Trc1, Trc2 and diodes Dc1, Dc2, Dc3, Dc4 around the W-phase coil 12c.

Since the inverter 2, different from the inverter of a general PM motor, further includes two added diodes in each phase (the diodes Da3, Da4, Db3, Db4, Dc3, Dc4), the inverter 2 is able to pass direct current. Furthermore, since the inverter 2 has no neutral point unlike the inverter of a general PM motor, the inverter 2 is able to control each phase under an independent exciting condition.

The step-up unit 3 is provided between the inverter 2 and the battery 4. The step-up unit 3 steps up voltage that is applied to the SR motor 1. The step-up unit 3 is, for example, a step-up converter. The step-up unit 3 is controlled by the electronic control unit 100.

The electronic control unit (ECU) 100 controls the drive of the SR motor 1. The electronic control unit 100 includes a CPU, a storage unit, and a computing unit. The storage unit stores data, such as various programs. The computing unit carries out various computations for controlling the drive of the SR motor 1. As a result of computations in the computing unit, command signals for controlling the inverter 2 are output from the electronic control unit 100 to the inverter 2. In this way, the electronic control unit 100 controls voltage and current that are applied to the SR motor 1 by controlling the inverter 2.

The electronic control unit 100 is connected to a rotation speed sensor 51, an accelerator operation amount sensor 52, a vehicle speed sensor 53, and a temperature sensor 54. The rotation speed sensor 51 is specifically formed of a resolver. The rotation speed sensor 51 detects a rotation speed of the rotor 20 of the SR motor 1, and outputs the detected signal (resolver signal) to the electronic control unit 100. The accelerator operation amount sensor 52 detects a depression amount of an accelerator pedal by a driver, and outputs the detected signal to the electronic control unit 100. The vehicle speed sensor 53 detects a running speed of the vehicle, and outputs the detected signal to the electronic control unit 100. The temperature sensor 54 detects a temperature of the coils 12, and outputs the detected signal to the electronic control unit 100.

The electronic control unit 100 identifies a relative positional relation between the stator teeth 11 and the rotor teeth 21 in a rotational direction based on the detected signal that is input from the rotation speed sensor 51, and executes control for repeatedly switching the coil 12 to be energized in units of phase based on the positional relation. In this control, the electronic control unit 100 excites the stator teeth 11 by passing current through one-phase coil 12, and generates magnetic attraction between the stator teeth 11 and the rotor teeth 21 located near the stator teeth 11, thus causing the rotor 20 to rotate.

Figure 4:
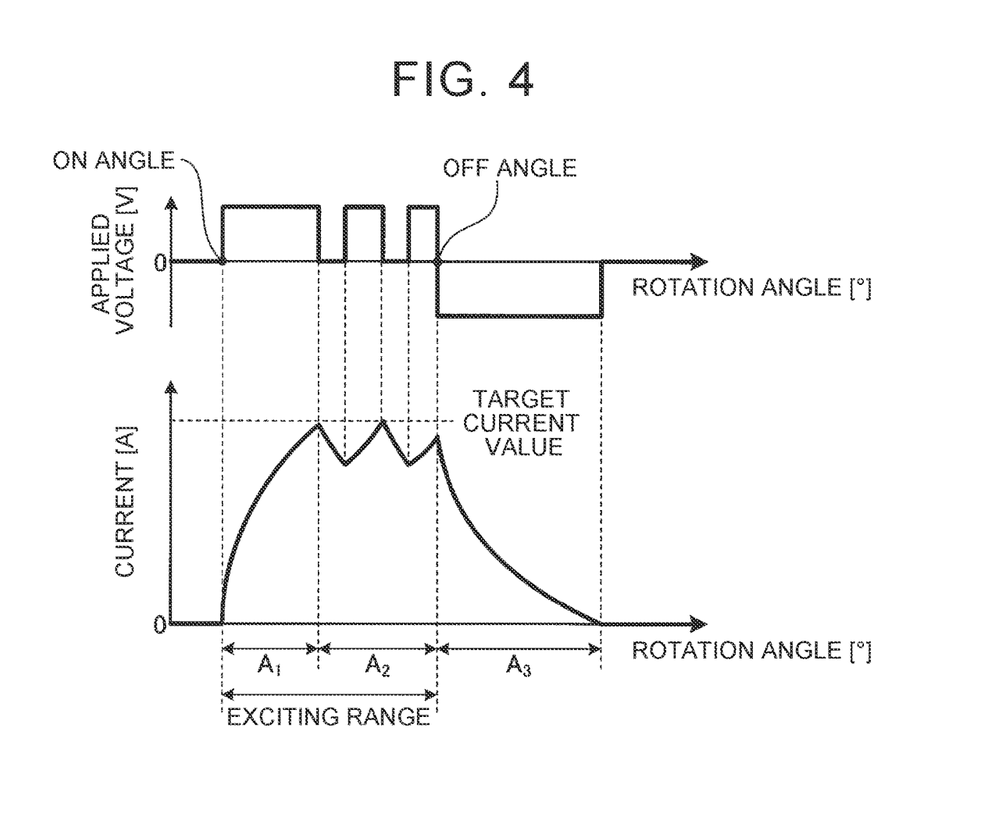
FIG. 4 shows graphs respectively showing an applied voltage waveform and a current waveform in the controller for a switched reluctance motor according to the embodiment of the disclosure.

As shown in FIG. 4, the electronic control unit 100 starts passing current to the coil 12 to be excited when the rotation angle of any one of the rotor teeth 21 enters an exciting range, that is, when the rotation angle becomes an on angle (excitation start angle). The electronic control unit 100 sets zero for current passing through the coil 12 to be excited when the rotation angle of the any one of the rotor teeth 21 exits from the exciting range, that is, when the rotation angle becomes an off angle (excitation stop angle). As shown in FIG. 4, the exciting range does not mean a range ($A_1+A_2+A_3$) in which current is passing through the coil 12, and the exciting range means a rotation angular range of the rotor 20 from the on angle to the off angle, that is, a range ($A_1+A_2$) from the start of excitation of any one of the coils 12 to the stop of the excitation.

When the rotation angle of the any one of the rotor teeth 21 falls within the range $A_1$, the electronic control unit 100 executes a positive voltage mode in which a positive voltage is applied to the coil 12 wound around the stator teeth 11 to be excited, and controls current such that the current increases to a target current value.

When the rotation angle of the any one of the rotor teeth 21 falls within the range $A_2$, the electronic control unit 100 alternately executes the positive voltage mode and a recirculation mode over the coil 12 wound around the stator teeth 11 to be excited, and controls current such that the current becomes a magnitude near the target current value. The recirculation mode means a control mode in which no voltage is applied to the coil 12 and current is recirculated within the inverter 2 via the coil 12.

When the rotation angle of the any one of the rotor teeth 21 falls within the range $A_3$, the electronic control unit 100 executes a negative voltage mode in which negative voltage is applied to the coil 12 wound around the stator teeth 11 to be excited, and controls current such that the current becomes zero.

Figure 5:
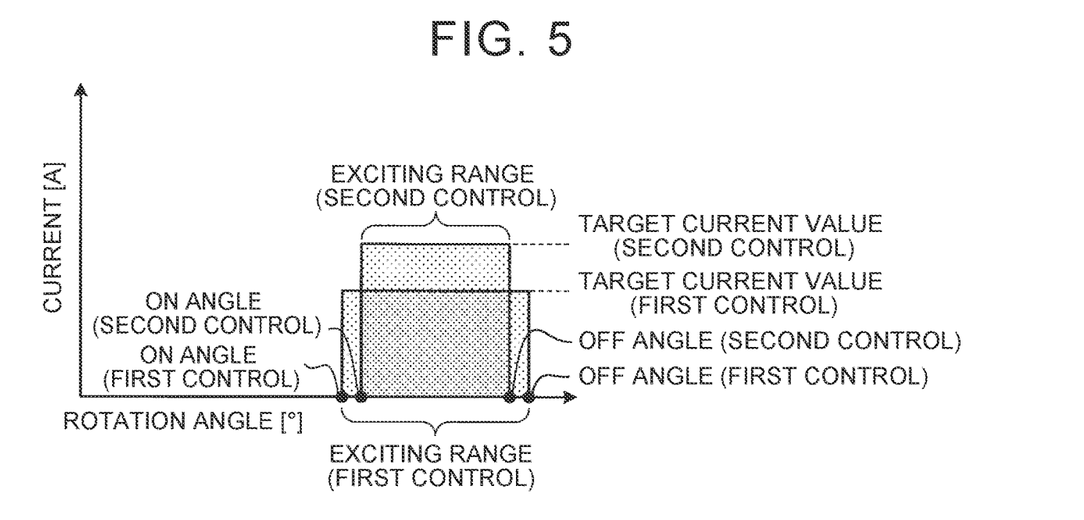
FIG. 5 is a graph that shows the relation between an exciting range and a target current value in first control and the relation between an exciting range and a target current value in second control in the controller for a switched reluctance motor according to the embodiment of the disclosure.

The electronic control unit 100 executes first control and second control as current control of the SR motor 1. The first control is current control that is executed during normal running. The first control means control for exciting the three-phase coils 12 (specifically, the phase coil 12 to be excited among the three-phase coils 12) at a predetermined target current value in a predetermined exciting range as shown in FIG. 5. In the first control, in order to satisfy a driving force that is required during normal running, the three-phase coils 12 are excited at a target current value that the SR motor 1 should output. FIG. 5 visually shows the relation between an exciting range of the coil 12 and a target current value, and does not show a current waveform (see FIG. 4 for the current waveform).

The second control is current control that is executed when the vehicle is not able to start moving even when the first control is executed. The second control means control for exciting the three-phase coils 12 (specifically, the phase coil 12 to he excited among the three-phase coils 12) at a current value larger than the current value of the first control in an exciting range narrower than the exciting range of the first control, as shown in FIG. 5. As will be described later, the electronic control unit 100 executes the second control only when the temperature of the phase coil 12 having an inductance of a positive gradient is lower than or equal to a predetermined threshold (see step S5 of FIG. 6 (described later)). In the present embodiment, when the second control is executed instead of the first control under a predetermined condition, it is possible to reduce heat generation of the coils 12 and also improve the startability of the vehicle. The second control is executable not only when the vehicle is not able to start moving with full accelerator pedal depression but also when the vehicle is not able to start moving with constant accelerator pedal depression.

In the present embodiment, the exciting range during the first control is defined as first exciting range, and the target current value during the first control is defined as first current value. The exciting range during the second control is defined as second exciting range, and the target current value during the second control is defined as second current value. In the present embodiment, a total amount of current in the first exciting range during the first control is equal to a total amount of current in the second exciting range during the second control. Thus, even when the second control is executed instead of the first control, it is possible to increase torque while keeping the amount of heat generation of the coil 12 at the same level as the first control.

The target current value of each of the first control and the second control is described in an exciting condition map (not shown) together with, for example, the on angle (excitation start angle) and the off angle (excitation stop angle) in the corresponding exciting range. During drive control over the SR motor 1 (described later), the electronic control unit 100 derives a required driving force based on an accelerator operation amount detected by the accelerator operation amount sensor 52, and loads the exciting condition map appropriate for the required driving force. Thus, the electronic control unit 100 determines a target current value for a corresponding one of the first control and the second control.

As will be described later, the electronic control unit 100 is executing the first control over the three-phase coils 12. When the electronic control unit 100 determines that the vehicle is not able to start moving even when the electronic control unit 100 executes the first control, the electronic control unit 100 executes the second control over the phase coil 12 having an inductance of a positive gradient, and executes the first control over the phase coil 12 having an inductance of a negative gradient (see step S3, step S4, step S7, step S9, and step S10 of FIG. 6 (described later)). In this way, the controller for the SR motor 1 is able to efficiently increase torque by executing the second control over only the phase coil 12 having an inductance of a positive gradient.

Figure 6:
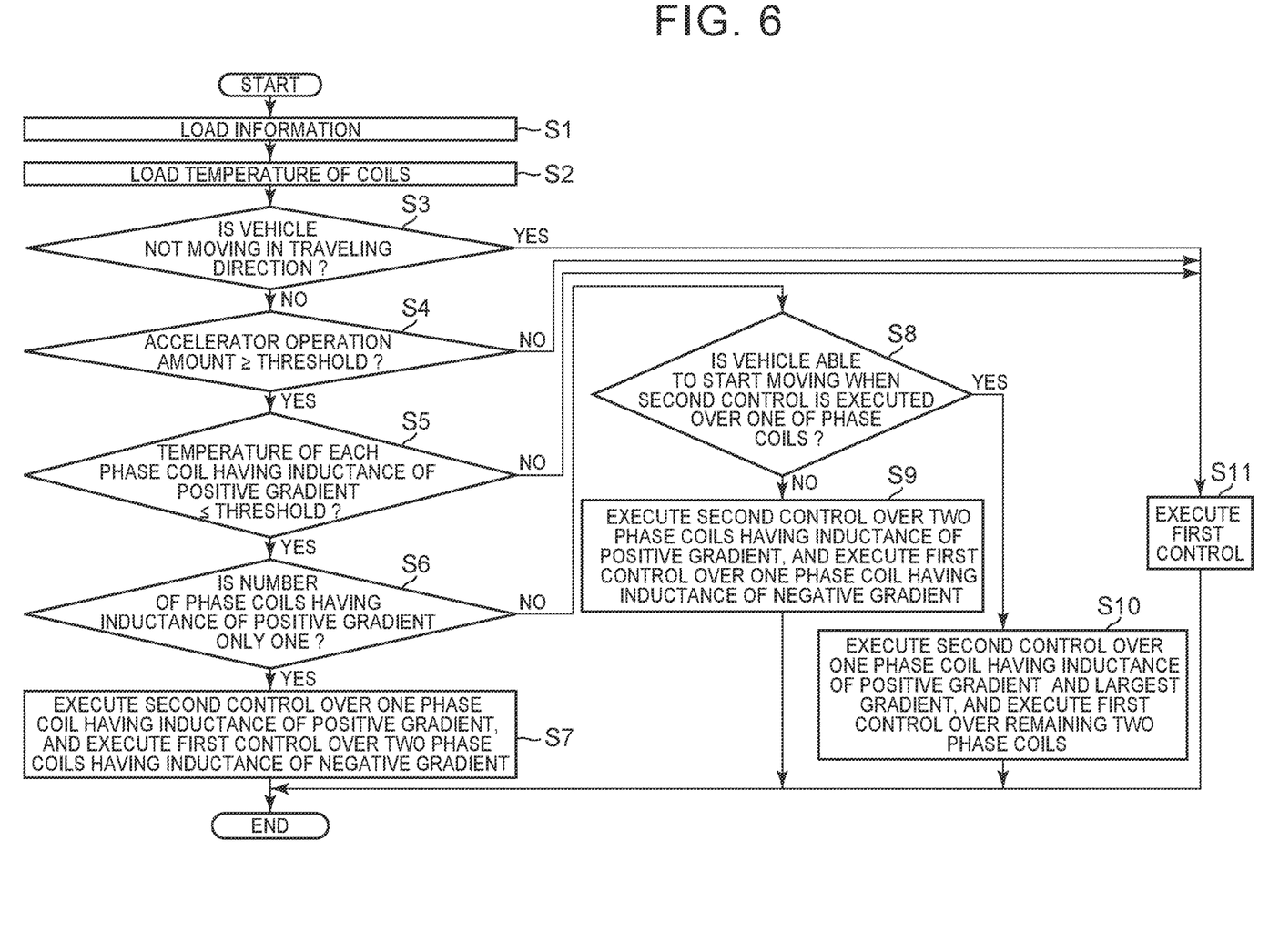
FIG. 6 is a flowchart that shows a drive control method that is executed by the controller for a switched reluctance motor according to the embodiment of the disclosure.

When the electronic control unit 100 determines that there is a plurality (for example, two) of the phase coils 12 having an inductance of a positive gradient and determines that the vehicle is not able to start moving even when the electronic control unit 100 executes the second control over one of the phase coils 12 having an inductance of a positive gradient, the electronic control unit 100 executes the second control over the plurality of phase coils 12 having an inductance of a positive gradient, and executes the first control over the remaining phase coil 12 (for example, one phase coil) having an inductance of a negative gradient (see step S6, step S8, and step S9 of FIG. 6 (described later)). In this way, the controller for the SR motor 1 is able to further reliably cause the vehicle to start moving by executing the second control over the plurality of phase coils 12 having an inductance of a positive gradient.

When the electronic control unit 100 determines that there is a plurality (for example, two) of the phase coils 12 having an inductance of a positive gradient, and determines that the vehicle is able to start moving by executing the second control over one of the phase coils 12 having an inductance of a positive gradient, the electronic control unit 100 executes the second control over one of the phase coils 12 having an inductance of a positive gradient and the largest gradient, and executes the first control over the remaining phase coils 12 (for example, two phase coils) (see step S6, step S8, and step S10 of FIG. 6 (described later)). In this way, the controller for the SR motor 1 is able to further efficiently increase torque by executing the second control over one of the phase coils 12 having an inductance of a positive gradient and the largest gradient.

Hereinafter, a drive control method with the controller for the SR motor 1 according to the present embodiment will be described with reference to FIG. 6 to FIG. 9. During normal running of the vehicle, that is, at the start of FIG. 6, the electronic control unit 100 is executing the first control.

Initially, the electronic control unit 100 loads various pieces of information that are used in drive control over the SR motor 1, as shown in FIG. 6 (step S1). The various pieces of information specifically mean the rotation speed and rotation angle (phase) of the rotor 20 based on a detected signal of the rotation speed sensor 51. Although not shown in FIG. 6, the electronic control unit 100 derives a required driving force based on an accelerator operation amount detected by the accelerator operation amount sensor 52, and loads the exciting condition map in step S1.

Subsequently, the electronic control unit 100 loads the temperature of the three-phase coils 12 based on a detected signal of the temperature sensor 54 (step S2). Subsequently, the electronic control unit 100 determines whether the vehicle is moving in a traveling direction based on a detected signal of the vehicle speed sensor 53 (step S3). The state where the vehicle is not moving in the traveling direction includes a state where the vehicle is stopped on, for example, a hill road, or the like, and a state where the vehicle is moving in a direction opposite to the traveling direction (a state where the vehicle is sliding down).

When it is determined in step S3 that the vehicle is not moving in the traveling direction (No in step S3), the electronic control unit 100 determines whether the accelerator operation amount detected by the accelerator operation amount sensor 52 is higher than or equal to a preset threshold (first threshold) (step S4).

When it is determined in step S4 that the accelerator operation amount is higher than or equal to the preset threshold (first threshold) (Yes in step S4), the electronic control unit 100 determines whether the temperature of each phase coil 12 having an inductance of a positive gradient is lower than or equal to a preset threshold (second threshold) (step S5). In the present embodiment, the case where the vehicle is not moving in the traveling direction (No in step S3) and the accelerator operation amount is higher than or equal to the first threshold (Yes in step S4) corresponds to the case where the vehicle is not able to start moving.

When it is determined in step S5 that the temperature of each phase coil 12 having an inductance of a positive gradient is lower than or equal to the preset threshold (second threshold) (Yes in step S5), the electronic control unit 100 determines whether the number of the phase coils 12 having an inductance of a positive gradient is only one (step S6).

When it is determined in step S6 that the number of the phase coils 12 having an inductance of a positive gradient is only one (Yes in step S6), the electronic control unit 100 executes the second control over the phase coil 12 having an inductance of a positive gradient, and continues the first control over the two phase coils 12 having an inductance of a negative gradient (step S7), after which the electronic control unit 100 ends the process. In step S7, specifically, the electronic control unit 100 executes the second control over the one phase coil having an inductance of a positive gradient and executes the first control over the two phase coils having an inductance of a negative gradient until the vehicle moves in the traveling direction, and switches into the first control over all the phase coils after the vehicle moves in the traveling direction, after which the electronic control unit 100 ends the process.

Phase-independent current control shown in step S6 and step S7 is executable because the SR motor 1 is able to be driven with a single phase, and is not executable over, for example, a PM motor that is not able to be driven with a single phase.

Figure 7:
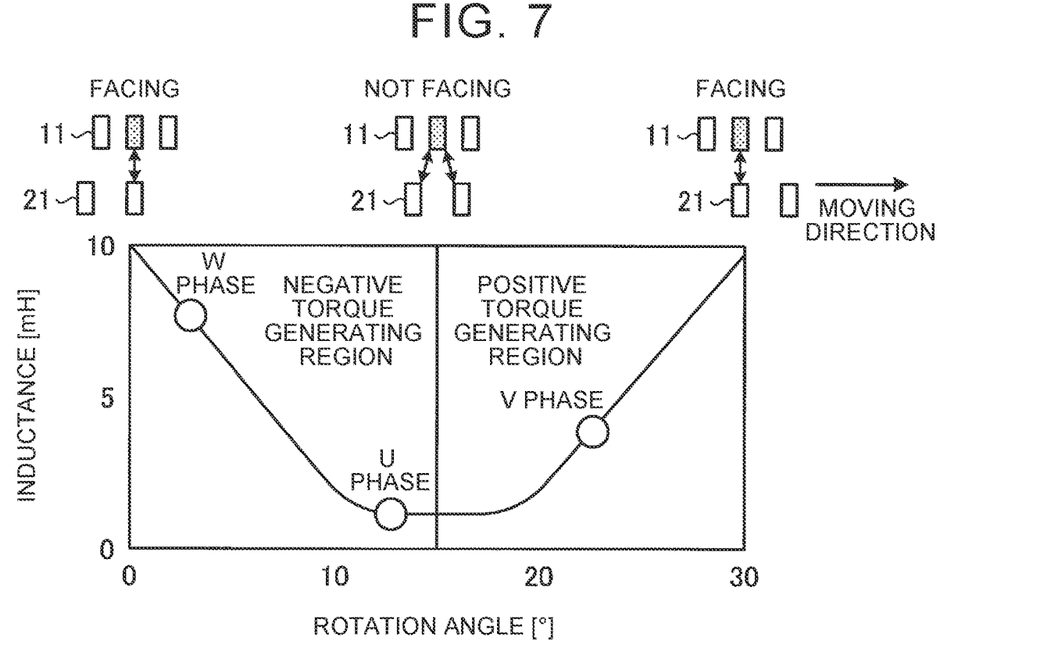
FIG. 7 is a graph that shows the relation between a rotation angle of a rotor and an inductance of each coil in the controller for a switched reluctance motor according to the embodiment of the disclosure.

In the above-described step S6, the electronic control unit 100, for example, executes the second control over the V-phase coil 12 having an inductance of a positive gradient, and continues the first control over the U-phase and W-phase coils 12 having an inductance of a negative gradient, as shown in FIG. 7. As shown in FIG. 7, the gradient means the slope of an inductance to the rotation angle θ of the rotor 20.

When it is determined in step S6 that the number of the phase coils 12 having an inductance of a positive gradient is not only one (No in step S6), the electronic control unit 100 determines whether the vehicle is able to start moving by executing the second control over one of the phase coils 12 having an inductance of a positive gradient (step S8).

When it is determined in step S8 that the vehicle is not able to start moving by executing the second control over one of the phase coils 12 having an inductance of a positive gradient (No in step S8), the electronic control unit 100 executes the second control over the two phase coils 12 having an inductance of a positive gradient, and continues the first control over one phase coil 12 having an inductance of a negative gradient (step S9), after which the electronic control unit 100 ends the process. In step S9, specifically, the electronic control unit 100 executes the second control over the two phase coils having an inductance of a positive gradient and executes the first control over the one phase coil having an inductance of a negative gradient until the vehicle moves in the traveling direction, and switches into the first control over all the phase coils after the vehicle moves in the traveling direction, after which the electronic control unit 100 ends the process.

Figure 8:
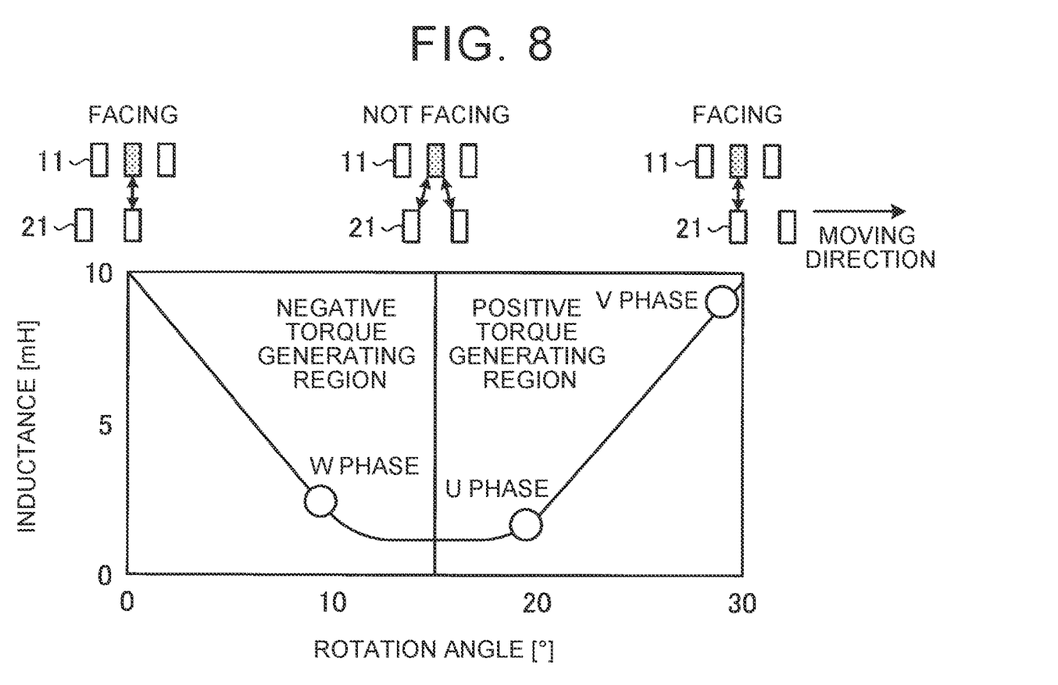
FIG. 8 is a graph that shows the relation between a rotation angle of the rotor and an inductance of each coil in the controller for a switched reluctance motor according to the embodiment of the disclosure.

In the above-described step S8 and step S9, the electronic control unit 100, for example, executes the second control over the V-phase and U-phase coils 12 having an inductance of a positive gradient, and continues the first control over the W-phase coil 12 having an inductance of a negative gradient, as shown in FIG. 8.

When it is determined in step S8 that the vehicle is able to start moving by executing the second control over one of the phase coils 12 having an inductance of a positive gradient (Yes in step S8), the electronic control unit 100 executes the second control over the one of the phase coils 12 having an inductance of a positive gradient and the largest gradient, continues the first control over the remaining phase coils 12 (for example, two phase coils 12) (step S10), after which the electronic control unit 100 ends the process. In step S10, specifically, the electronic control unit 100 executes the second control over the one of the phase coils having an inductance of a positive gradient and the largest gradient and executes the first control over the remaining two phase coils until the vehicle moves in the traveling direction, and switches into the first control over all the phase coils after the vehicle moves in the traveling direction, after which the electronic control unit 100 ends the process.

In the above-described step S8 and step S10, the electronic control unit 100, for example, executes the second control over the V-phase coil 12 having an inductance of a positive gradient and the largest gradient, and continues the first control over the U-phase coil 12 having an inductance of a positive gradient and the not-largest gradient and the W-phase coil 12 having an inductance of a negative gradient, as shown in FIG. 8. As shown in FIG. 8, when there is a plurality of the phase coils 12 having an inductance of a positive gradient, the SR motor 1 generates larger torque when the phase coil 12 having an inductance of a larger gradient (V-phase coil 12) is excited than when the phase coil 12 having an inductance of a smaller gradient (U-phase coil 12) is excited.

When it is determined in the above-described step S3 that the vehicle is moving in the traveling direction (Yes in step S3), or when it is determined in the above-described step S4 that the accelerator operation amount is lower than the preset threshold (first threshold) (No in step S4), or when it is determined in the above-described step S5 that the temperature of each phase coil 12 having an inductance of a positive gradient exceeds the preset threshold (second threshold) (No in step S5), the electronic control unit 100 continues the first control over all the phase coils 12 (step S11), after which the electronic control unit 100 ends the process.

As described above, when the vehicle does not start moving even when the first control for exciting the coils 12 at a predetermined current value in a predetermined exciting range is executed, the controller for the SR motor 1 according to the present embodiment executes the second control for exciting one or two of the coils 12 at a current value larger than that of the first control in an exciting range narrower than that of the first control. Thus, the controller is able to reduce heat generation of the coils 12 as compared to the case where one or two of the coils 12 are excited at a current value larger than that of the first control in the same exciting range as that of the first control. Therefore, with the controller for the SR motor 1, it is possible to improve the startability of the vehicle while reducing heat generation of the coils 12. That is, it is possible to reduce the amount of heat generation of the coils 12 and also improve the startability of the vehicle. With the controller for the SR motor 1, for example, it is not required to increase the size of a cooling device in order to reduce heat generation.

Figure 9:
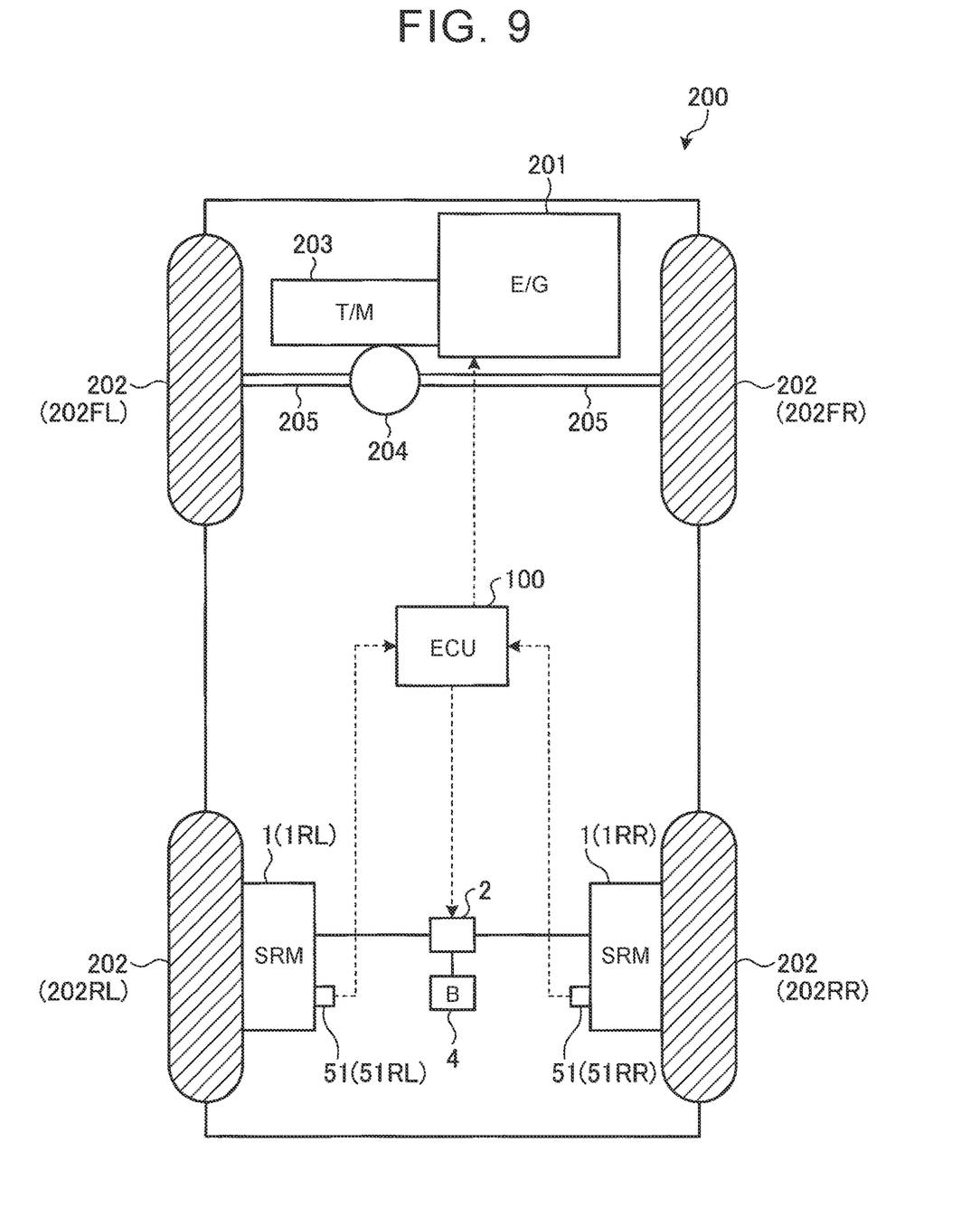
FIG. 9 is a skeletal diagram that shows a vehicle to which the controller for a switched reluctance motor according to the embodiment of the disclosure is applied.

Hereinafter, a vehicle to which the controller for the SR motor 1 according to the present embodiment is applied will be described with reference to FIG. 9. The vehicle 200 shown in FIG. 9 includes an engine (abbreviated as E/G in FIG. 9) 201, wheels 202, a transmission (abbreviated as T/M in FIG. 9) 203, a differential gear 204, drive shafts 205, and the SR motors (abbreviated as SRMs in FIG. 1 and FIG. 9) 1 that serve as power sources for propelling the vehicle 200. The vehicle 200 is a four-wheel-drive vehicle. The engine 201 drives the right and left front wheels 202FR, 202FL. The SR motors 1 are rear motors, and drive the right and left rear wheels 202RR, 202RL.

The SR motors 1 are so-called in-wheel motors, and are respectively provided one by one in the right and left rear wheels 202RR, 202RL. In a rear drive unit of the vehicle 200, the left rear SR motor 1RL is connected to the left ear wheel 202RL, and the right rear SR motor 1RR is connected to the right rear wheel 202RR. The right and left rear wheels 202RR, 202RL are rotatable independently of each other.

The left rear wheel 202RL is driven by torque (motor torque) output from the left rear SR motor 1RL. The right rear wheel 202RR is driven by torque (motor torque) output from the right rear SR motor 1RR.

The left rear SR motor 1RL and the right ear SR motor 1RR are connected to the battery 4 via the inverter 2. The left rear SR motor 1RL functions as an electric motor with electric power that is supplied from the battery 4, and also functions as a generator that converts torque (external force), which is transmitted from the rear wheel 202RL, to electric power. The right rear SR motor 1RR functions as an electric motor with electric power that is supplied from the battery 4, and also functions as a generator that converts torque (external force), which is transmitted from the rear wheel 202RR, to electric power. The inverter 2 includes an electrical circuit for the left rear SR motor 1RL and an electrical circuit for the right rear SR motor 1RR.

The electronic control unit 100 controls the left rear SR motor 1RL, the right rear SR motor 1RR, and the engine 201. For example, the electronic control unit 100 includes an SR motor electronic control unit (SR motor ECU) and an engine electronic control unit (engine ECU). In this case, the engine ECU executes engine torque control through intake air control, fuel injection control, ignition control, and the like. The engine torque control is control for adjusting the output torque of the engine 201 to a target torque value. The SR motor ECU executes motor control over the left rear SR motor 1RL and the right rear SR motor 1RR based on a resolver signal that is input from the rotation speed sensor 51. The rotation speed sensor 51 includes a left rear rotation speed sensor 51RL and a right rear rotation speed sensor 51RR. The left rear rotation speed sensor 51RL detects the rotation speed of the left rear SR motor 1RL. The right rear rotation speed sensor 51RR detects the rotation speed of the right rear SR motor 1RR.

The controller for a switched reluctance motor according to the disclosure is specifically described by way of the embodiment of the disclosure; however, the disclosure is not limited to the above-described configuration. The disclosure should be interpreted widely based on the statements of the appended claims. Of course, the disclosure encompasses various modifications, changes, and the like, based on these statements.

For example, in the controller for the SR motor 1 according to the present embodiment, a step-down unit (step-down converter) that steps down voltage that is applied to the SR motor 1 may be provided instead of the step-up unit 3 (see FIG. 1).

An application example of the controller for the SR motor 1 according to the embodiment is not limited to the one shown in FIG. 9 (hereinafter, referred to as application example 1). For example, in an application example of the controller for the SR motor 1, different from the application example 1, the SR motor 1 may be provided in each of the wheels 202 (application example 2). Alternatively, different from the application example 1, a rear-wheel-drive vehicle in which no front drive unit is provided may be applied (application example 3).

In an application example of the controller for the SR motor 1, different from the application examples 1 to 3, a power source for propelling the vehicle 200 is only the SR motors 1 that serve as in-wheel motors (application example 4). Different from the application example 4, the SR motors 1 may be other than in-wheel motors (application example 5).

In an application example of the controller for the SR motor 1, different from the application example 5, the structure of the application example 1 may be mounted as a front drive unit (application example 6). Different from the application example 3, the rear drive unit may be not provided or, different from the application example 4, arrangement of the front and rear drive units may be opposite (application example 7).

What is claimed is:

1. A controller for a switched reluctance motor, the switched reluctance motor including a rotor, a stator, and a coil wound on the stator, the switched reluctance motor being mounted on a vehicle as a drive source for propelling the vehicle, the controller comprising an electronic control unit, the electronic control unit being configured to:
   execute first control for exciting the coil at a first current value in a first exciting range; and
   execute second control for exciting the coil at a second current value larger than the first current value in a second exciting range narrower than the first exciting range, when the electronic control unit determines that the vehicle is not able to start moving even when the electronic control unit executes the first control.

2. The controller according to claim 1, wherein each of the first and second exciting ranges is a range of a rotation angle of the rotor from start of excitation of the coil to stop of the excitation.

3. The controller according to claim 1, wherein the electronic control unit is configured to:
   execute the second control over a phase coil or a plurality of the phase coils having an inductance of a positive gradient; and
   execute the first control over a phase coil or a plurality of the phase coils having an inductance of a negative gradient.

4. The controller according to claim 3, wherein:
   the inductance increases as a rotation angle of the rotor increases, in the case of the inductance of the positive gradient; and
   the inductance decreases as the rotation angle of the rotor increases, in the case of the inductance of the negative gradient.

5. The controller according to claim 3, wherein the electronic control unit is configured to:
   when the electronic control unit determines that there is a plurality of the phase coils having the inductance of the positive gradient and determines that the vehicle is not able to start moving even when the electronic control unit executes the second control over one of the plurality of the phase coils having the inductance of the positive gradient, execute the second control over the plurality of the phase coils having the inductance of the positive gradient; and
   when the electronic control unit determines that there is a plurality of the phase coils having the inductance of the positive gradient and determines that the vehicle is not able to start moving even when the electronic control unit executes the second control over one of the plurality of the phase coils having the inductance of the positive gradient, execute the first control over a phase coil having the inductance of the negative gradient in the coil.

6. The controller according to claim 3, wherein the electronic control unit is configured to:
   when the electronic control unit determines that there is a plurality of the phase coils having the inductance of the positive gradient and determines that the vehicle is able to start moving when the electronic control unit executes the second control over one of the plurality of the phase coils having the inductance of the positive gradient, execute the second control over one of the plurality of the phase coils having the inductance of the positive gradient and the largest gradient; and
   when the electronic control unit determines that there is a plurality of the phase coils having the inductance of the positive gradient and determines that the vehicle is able to start moving when the electronic control unit executes the second control over one of the plurality of the phase coils having the inductance of the positive gradient, execute the first control over a plurality of the phase coils in the coil.

7. The controller according to claim 1, Wherein the electronic control unit is configured to execute the second control only when a temperature of a phase coil or a plurality of the phase coils having an inductance of a positive gradient is lower than or equal to a predetermined threshold.

8. The controller according to claim 1, wherein a total amount of current in the first exciting range of the first control is equal to a total amount of current in the second exciting range of the second control.

* * * * *